United States Patent
Christie, Jr.

(10) Patent No.: US 7,634,784 B2
(45) Date of Patent: Dec. 15, 2009

(54) DATA STORAGE MEANS

(75) Inventor: Leslie G. Christie, Jr., Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 923 days.

(21) Appl. No.: 11/076,324

(22) Filed: Mar. 9, 2005

(65) Prior Publication Data

US 2005/0229198 A1   Oct. 13, 2005

Related U.S. Application Data

(60) Provisional application No. 60/561,148, filed on Apr. 8, 2004.

(51) Int. Cl.
*G11B 23/03* (2006.01)

(52) U.S. Cl. .................... 720/730; 361/684; 360/99.06; 365/52

(58) Field of Classification Search ............ 360/99.06; 720/730; 361/684, 685; 365/52
See application file for complete search history.

(56) References Cited

U.S. PATENT DOCUMENTS

| | | | | |
|---|---|---|---|---|
| 4,680,731 A | * | 7/1987 | Izumi et al. | 365/52 |
| 4,844,465 A | * | 7/1989 | Hibino et al. | 273/148 B |
| 4,941,841 A | * | 7/1990 | Darden et al. | 361/685 |
| 5,155,663 A | * | 10/1992 | Harase | 361/684 |
| 5,831,525 A | * | 11/1998 | Harvey | 340/507 |
| 5,862,119 A | * | 1/1999 | Nishijima et al. | 720/612 |
| 5,986,848 A | * | 11/1999 | Kobayashi et al. | 360/85 |
| 6,137,759 A | * | 10/2000 | Ogiro et al. | 720/640 |
| 6,330,125 B2 | * | 12/2001 | Hashimoto et al. | 360/99.06 |

* cited by examiner

*Primary Examiner*—Angel A. Castro (57) ABSTRACT

Apparatus in accordance with at least one embodiment of the present invention includes a data storage cartridge and/or a receiver configured to receive the cartridge in facilitation of data transfer to and/or from the cartridge. The cartridge and the receiver each include respective connector portions configured to connect when the cartridge is inserted into the receiver. The cartridge and/or the receiver also include guide features configured to facilitate alignment of the connector portions for connection as the cartridge is inserted into the receiver.

14 Claims, 8 Drawing Sheets

DATA STORAGE MEANS

This application claims the benefit of U.S. Provisional Application 60/561,148, filed Apr. 8, 2004.

BACKGROUND

Various types of data storage devices are known. Many such data storage devices employ a removable cartridge scheme, wherein one or more portable data storage cartridges ("cartridges") can be temporarily inserted into a read/write device for transfer of data to/from the cartridge. Each of the cartridges generally includes some type of data storage medium that can be accessed by the read/write device for reading and/or writing data.

The cartridge can be stored remotely when actual transfer of data is not taking place. That is, the cartridge can be placed into a storage mode when access to the data thereon is not required. Selected cartridges can then be retrieved from respective storage modes and placed into a read/write device as needed when access to the data stored thereon is required. This cartridge concept allows the accumulation and storage of virtually unlimited quantities of data.

In some cases, the read/write device directly accesses the data storage medium, such as in the case of a magnetic tape cartridge wherein a tape read/write head supported by the read/write device contacts the storage medium (i.e. the magnetic tape) for reading and/or writing of data from/to the tape. That is, in such cases the data storage medium is directly contacted by at least a portion of the read/write device.

In other cases, the storage medium within the cartridge is accessed indirectly via signal conveyance means, such as electrical circuits or the like, in one or more various forms. For example, each cartridge can include an integral read/write head for accessing the data storage medium. Generally, in such cases a set of connectors is employed, wherein a first portion of the connector is supported on the cartridge and linked for data signal transmission to the integral read/write head.

A second portion of the connector is supported by the read/write device and is configured to matingly connect with the first connector portion when the cartridge is inserted into the read/write device. The second connector portion is linked for data signal transmission to a host device, such as a computer.

Ideally, when the cartridge is inserted into the read/write device, the first and second connector portions matingly connect with one another. In this manner, when the cartridge is inserted into the read/write device, the host device can receive data from the storage medium and/or send data to the storage medium via the first and second connector portions and the read/write device.

In order to provide effective communication, the connector portions are necessarily configured to have many individual connections, or contacts. Such configuration, in turn, generally requires relatively precise alignment of the first and second connector portions in order to achieve successful connection therebetween without damage to the connector portions.

Automatic cartridge handling systems, known also as "libraries," are often employed to automatically move cartridges between storage locations and read/write devices. Often, such automatic cartridge handling systems include one or more "robot-like" picking devices, as well as one or more storage racks or the like that are configured to provide a storage mode means for a plurality of cartridges.

The picking device generally has an "arm" that is configured to physically retrieve predetermined cartridges from the storage rack, and place the cartridges into the read/write device for transfer of data either to or from the cartridge. When the transfer of data is complete, the picking device removes the cartridge from the read/write device and places the cartridge back onto the storage rack. Often, automatic cataloguing systems are employed to track the location of each individual cartridge as the cartridges are moved between the storage rack and the read/write device by the picking device.

As is mentioned above, relatively precise alignment of the cartridge with the read/write device is required when the cartridge is being placed into the read/write device in order to avoid damage to the connector portions. Therefore, there are benefits to be derived from various cartridge and cartridge receiver apparatus that enable standard cartridge handling systems to place data storage cartridges into a read/write device accurately and without damage to the connector portions.

DETAILED DESCRIPTION

The present invention, in accordance with at least one embodiment thereof, generally includes a data storage cartridge and/or a receiver configured to receive the cartridge and transfer data to and/or from the cartridge. The cartridge and the receiver can each include respective connector portions configured to connect with one another as the result of insertion of the cartridge into the receiver, wherein such connection can enable data transfer. Guide features can be included on the cartridge and/or the receiver which can facilitate connective alignment of the connector portions.

Figure 1:
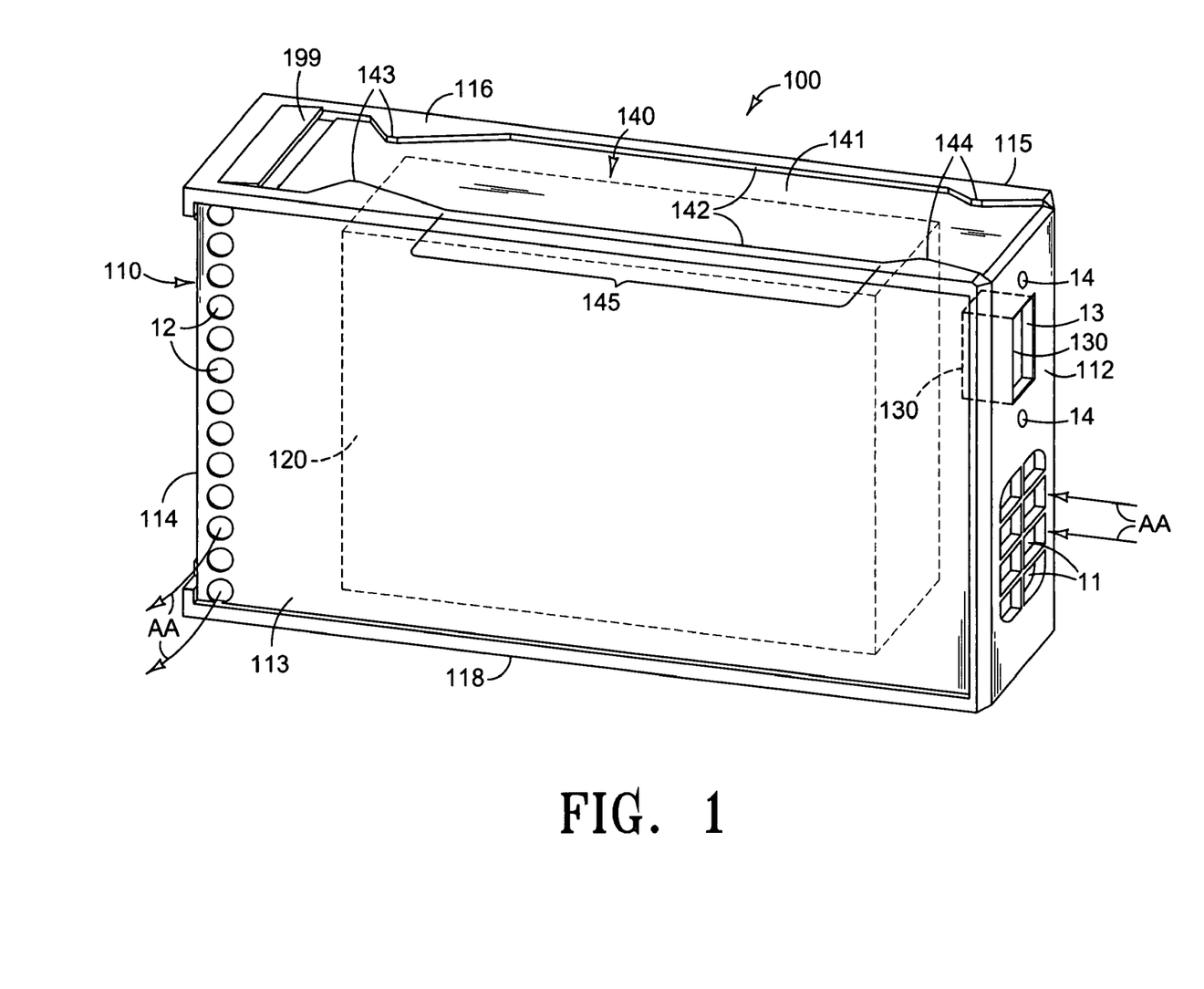
FIG. 1 is an isometric view of a cartridge in accordance with one embodiment of the present invention.

FIG. 1 shows a cartridge 100 in accordance with at least one embodiment of the present invention. The cartridge 100 can include a cartridge shell 110 that is configured to act as a housing or enclosure, as well as a support means, for various components. The cartridge shell 110 can be fabricated from any of a number of materials such as metal, plastic and the like.

As is seen from a study of FIG. 1, the cartridge shell 110 can generally have a box-like form that includes multiple facets. More specifically, a substantially flat face 112, or front side, can be defined by the cartridge shell 110. Likewise, a substantially flat back 114, or rear side, can also be defined by the cartridge shell 110. The face 112 and the back 114 can be oriented in substantially parallel, spaced-apart, juxtaposed relation to one another, as is shown.

Similarly, the cartridge 110 can define a pair of substantially flat panels 113 and 115 that can be oriented in substantially parallel, spaced-apart, juxtaposed relation to one another. More specifically, the pair of panels can include a first panel 113 and a second panel 115. Additionally, a pair of substantially flat sides 116 and 118 can be defined by the cartridge shell 110, wherein the pair of sides can be oriented in substantially parallel, spaced-apart juxtaposed relation to one another. The pair of sides can include a first side 116 and a second side 118.

The face 112, back 114, panels 113, 115, and sides 116, 118 can be arranged to form a box-like structure of the cartridge shell 110. More specifically, the pair of sides 116, 118 can extend between the pair of panels 113, 115 in substantially perpendicular relation thereto. Likewise, the face 112 and the back 114 can also extend between the pair of panels 113, 115 in substantially perpendicular relation thereto. Moreover, the face 112 and the back 114 can extend between the pair of sides 116, 118 in substantially perpendicular relation thereto.

The cartridge shell 110 can operatively house therein a memory device 120. That is, the cartridge 100 can include the memory device 120, wherein the memory device is operatively housed within the cartridge shell 110. The memory device 120 can have any of a number of specific forms such as that of a magnetic disk (i.e. hard disk) device, a digital memory "chip" device, an optical disk device, or the like. The memory device 120 is configured to provide data storage capability, which can thus render the cartridge 100 functional as a data storage apparatus.

The cartridge shell 110 can support a cartridge connector portion 130. The cartridge connector portion 130 can be configured to function as a communication portal between the memory device 120 and other devices external to the cartridge 100. That is, the cartridge connector portion 130 is configured to matingly connect with other connector portions (not shown) to facilitate the transmission of data signals to and from the memory device 120.

Accordingly, the cartridge connector portion 130 is linked with the memory device 120 for signal transmission therebetween. Such linkage between the cartridge connector portion 130 and the memory device 120 can be facilitated by way of a signal transmission cable (not show) or the like, such as an electrical wire or a fiber optic filament. Alternatively, any of a number of types of wireless signal transmission means can be employed to link the cartridge connector portion 130 with the memory device 120.

The cartridge shell 110 can define therethrough an air inlet 11. More specifically, the air inlet 11 can be defined through the face 112 as is depicted. The air inlet 11 is configured to enable an air stream "AA" to enter the cartridge shell 110. The cartridge shell 110 can also define therethrough at least one vent 12 to allow the air stream AA to exit the cartridge shell 110. More specifically, at least one vent 12 can be defined by each of the panels 113, 115. The air inlet 11 and vent 12 can allow the air stream M to flow through the cartridge shell 110 and around various components, such as the memory device 120, to provide for cooling of such components.

The cartridge shell 110 can also define therethrough a connector opening 13. More specifically, the connector opening 13 can be defined through the face 112, or front side. The cartridge connector portion 130 can be supported by the face 112 adjacent to the connector opening 13 and in juxtaposed aligned relation thereto, as is depicted.

The cartridge shell 110 can further define and/or support thereon one or more cartridge reference features 14. As is depicted, the cartridge reference features 14 can be in the form of reference holes that can be defined through the face 112. Inasmuch as a specific preferred embodiment of the invention is described and shown herein, the detailed description of a preferred embodiment herein is not intended to limit various features to those forms that are specifically shown and described.

Accordingly, for the sake of clarity in the description, various terms are used interchangeably in reference to a given element and/or feature. For example, the term "reference hole" is used herein in reference to the cartridge reference feature 14, although such reference is not intended to limit the cartridge connector feature to the form of a hole. Other such interchangeable terms are employed as noted below.

Still referring to FIG. 1, a pair of reference holes 14 can be defined through the face 12, wherein the connector opening 13 is positioned between the pair of reference holes, as is depicted. Each of the reference holes 14 can have any of a number of possible shapes. Although the reference holes 14 are specifically depicted in the accompanying figures as being substantially round, at least one of the reference holes can be in the form of an oblong hole, or slotted hole. The function of the reference holes 14 is explained further below.

The cartridge shell 10 can additionally define, or support, thereon at least one elongated cartridge guide region 140. For the sake of clarity, the cartridge guide region 140 is also referred to herein as a "female guide region" in accordance with the reasoning stated above, although such reference is not intended to limit the cartridge guide region to any specific form.

Additionally, each of the sides 116 and 118 can define thereon an associated female guide region 140, although only one such female guide region is visible in the view depicted by FIG. 1. The female guide region 140 is a feature that is defined by the cartridge shell 110, which facilitates guiding alignment of the cartridge 100.

The female guide region 140 can be substantially in the form of an open slot, or trough, as is depicted. More specifically, the female guide region 140 can be defined by a substantially flat bottom 141, and a pair of walls 142 extending from the bottom, wherein the pair of walls is in spaced-apart, juxtaposed relation to one another. The walls 142 can be substantially symmetrical with respect to one another. That is, each wall 142 can be substantially a "mirror image" of the other wall.

The cartridge guide region 140 can include a rear cartridge feature 143, and can also include a front cartridge feature 144. For the sake of clarity, the rear cartridge feature 143 is also referred to herein as a "rear bottleneck region," and the front cartridge feature 144 is also referred to herein as a "front bottleneck region" in accordance with the reasoning stated above. However, such references are not intended to limit the rear cartridge feature and/or the front cartridge feature to any specific forms.

The female guide region 140 can also include a run region 145 that separates the rear bottleneck region from the front bottleneck region. Each bottleneck region 143, 144 is a narrowed region, or constriction, of the female guide region 140 that is dimensioned for a close-tolerance fit with a corresponding guide member (not shown).

The front bottleneck region 144 can be substantially proximate to the face 112, while the rear bottleneck region 143 can be substantially distal from the face. In other words, the front bottleneck region 144 can be closer to the face 112 than the rear bottleneck region 143. Additionally, the rear bottleneck region 143 can be narrower than the front bottleneck region 144.

Moreover, the run region 145 can be wider than both the front bottleneck region 144 and the rear bottleneck region 143. The run region 145 can also be substantially straight, and can have a substantially constant width, as is depicted. The significance of the relative sizes and locations of the rear bottleneck region 143, the front bottleneck region 144, and the run region 145, is more apparent in later discussion.

A grab feature 199 can also be defined on the cartridge 100. The grab feature 199 can facilitate the "grasping" of the cartridge 100 by a picking device (not shown) or the like which can be employed to move the cartridge from place to place, such as into and/or out of a storage position and into and/or out of a read/write device (not shown). The grab feature 199 can have any of a number of specific configurations in addition to that which is specifically depicted in the accompanying figures.

Figure 2:
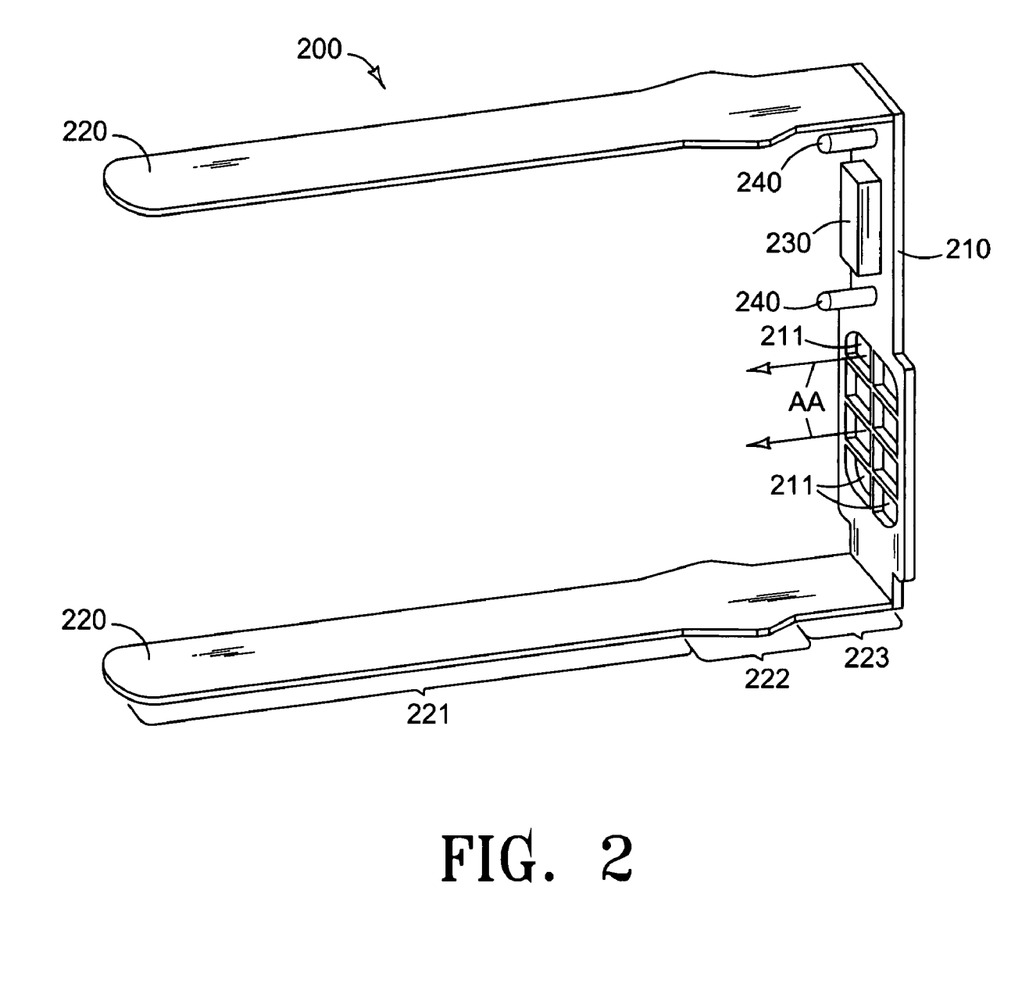
FIG. 2 is an isometric view of a receiver in accordance with one embodiment of the present invention.

FIG. 2 shows a receiver 200 in accordance with at least one embodiment of the present invention. The receiver 200 can be configured to receive, in mating engagement therewith, a cartridge such as the cartridge 100 described above with respect to FIG. 1. The interrelation of the cartridge 100 and the receiver 200 is described in greater detail further below.

The receiver 200 can be supported by, or can be a portion of, a read/write device (not shown) that is configured to receive data from, and/or send data to, a cartridge such as the cartridge 100 (described above). The receiver 200 can include a chassis 210. The chassis 210 can be substantially straight and flat.

The receiver 200 can also include at least one guide member 220 that extends from the chassis 210. The guide member 220 can have a substantially perpendicular orientation relative to the chassis 210, and can be substantially straight. The guide member 220 can have a substantially male form, as opposed to the female form that the cartridge guide region 140 (FIG. 1) can have. However, other specific forms of the guide member 220 are possible in accordance with alternative embodiments of the present invention, but which are not specifically depicted herein.

Such a male configuration of the guide member 220 depicted in the figures is more apparent with respect to further discussion. The guide member 220 can also have a substantially flat blade form. However, the guide member 220 can have other shapes, and that the depiction herein of the guide member having a specific shape and/or form is not intended to limit the guide member to that specific shape and/or form, or any other shape and/or form.

Additionally, when the receiver 200 includes a pair of guide members 220, the pair of guide members can be oriented in substantially parallel, space-apart, juxtaposed relation to one another. Also, when more than one guide member 220 is included in the receiver 200, the guide members can be of substantially equal length with respect to one another, although they need not be. Also, each of the guide members 220 can be of substantially similar size and shape with respect to one another, although they need not be.

The guide member 220 can define a front receiver feature 221. For the sake of clarity, the front receiver feature 221 is also referred to herein as a "tip region" in accordance with the reasoning stated above. However, such reference is not intended to limit the front receiver feature to any specific form. The tip region 221 can be substantially elongated. The tip region 221 can also have a substantially constant width, and can have a rounded end.

The guide member 220 can define a rear receiver feature 222. For the sake of clarity, the rear receiver feature 222 is also referred to herein as a "bulge region" in accordance with the reasoning stated above. However, such reference is not intended to limit the rear receiver feature to any specific form. The bulge region 222 can be wider than the tip region 221.

The guide member 220 can define a neck-down region 223 as well. The neck-down region 223 can be narrower than the bulge region 222. Moreover, the neck-down region 223 can be of substantially the same width as the tip region 221, although it need not be.

The tip region 221 can be distal from the chassis 210, while the bulge region 222 can be proximate the chassis. That is, the bulge region 222 can be closer to the chassis 210 than the tip region 221. When the guide member 220 includes a neck-down region 223, the neck-down region can be adjacent to the chassis 210, while the bulge region 222 can be between the tip region 221 and the neck-down region.

The guide member 220 can be configured to engage the female guide region 140 (discussed above with respect to FIG. 1), for guiding alignment of the cartridge 100 as the cartridge is received into the receiver 200. That is, as the cartridge 100 is inserted into, or received by, the receiver 200, the guide member 220 engages the female guide region 140 for guiding alignment of the cartridge relative to the receiver.

The chassis 210 can define therethrough an air outlet 211. The air outlet 211 can provide for the air stream AA to flow out of the air outlet and into the air inlet 11, which is described above with respect to FIG. 1. That is, the air outlet 211 can be configured to substantially align with, in juxtaposed relation to, the air inlet 11 when the cartridge 100 is fully received into the receiver 200. Such alignment of the air outlet 211 with the air inlet 11 can serve to facilitate the flow of the air stream AA from the air outlet and into the air inlet.

The receiver 200 can further include a receiver connector portion 230. The receiver connector portion 230 can be supported by the chassis 210. Furthermore, the receiver connector portion 230 can be configured to matingly connect with the cartridge connector portion 130, which is described briefly above with respect to FIG. 1.

That is, the receiver connector portion 230 and the cartridge connector portion 130 can be configured to matingly connect with one another as a result of the cartridge 100 being fully received into the receiver 200. Such mating connection enables signal transmission between the cartridge connector portion 130 and the receiver connector portion 230.

Moreover, the receiver connector portion 230 can be linked with another device (not shown) for signal transmission therebetween. The other device can be a host device such as a computer or the like. In such a situation, the insertion and full receipt of the cartridge 100 into the receiver 200 can result in connection of the cartridge connector portion 130 with the receiver connector portion 230. Such connection can ultimately enable signal transmission between the host device and the memory device 120 within the cartridge shell 110, described above with respect to FIG. 1.

The receiver 200 can further include at least one receiver reference feature 240. For the sake of clarity, the receiver reference feature 240 is also referred to herein as a "reference pin" in accordance with the reasoning stated above. However, such reference is not intended to limit the receiver reference feature to any specific form.

The reference pin 240 can extend from the chassis 210. More specifically, the reference pin 240 can extend from the chassis 210 in a substantially perpendicular orientation with respect thereto. In the instance wherein the receiver 200 includes a pair of reference pins 240, the pair of reference pins can be located such that the receiver connector portion 230 is substantially between the pair of reference pins, as is depicted. The function of the reference pins 240 is discussed further below.

Figure 3:
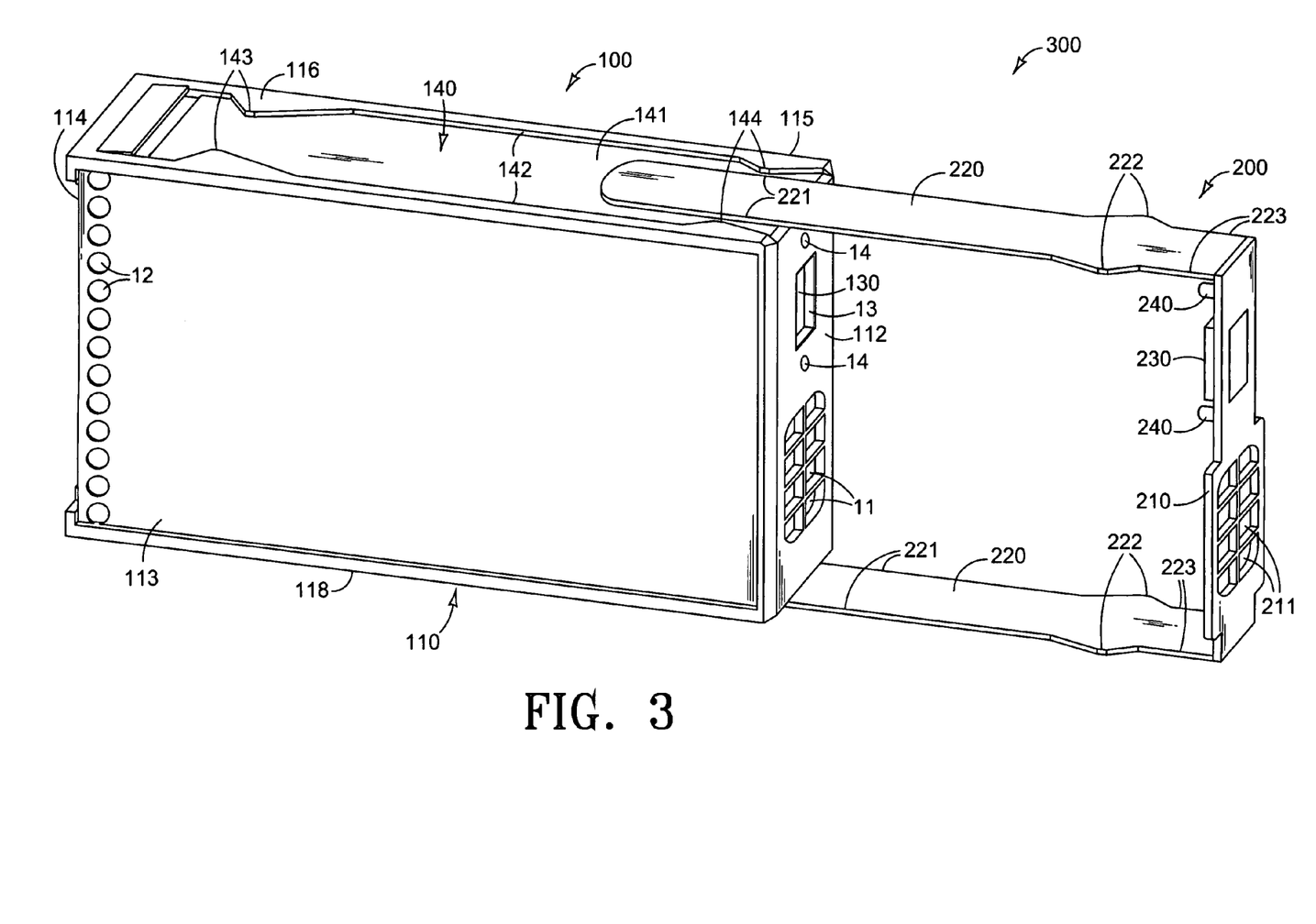
FIG. 3 is an isometric view of a cartridge and a receiver with one embodiment of the present invention, wherein the cartridge is initially engaging the receiver.

FIG. 3 shows both the cartridge 100 and the receiver 200. The cartridge 100 and the receiver are described above in detail with reference to FIGS. 1 and 2, respectively. A data storage apparatus 300, or system, can include at least one or both of the cartridge 100 and the receiver 200. For example, a plurality of cartridges 100 and at least one receiver 200 can make up at least a portion of a data storage apparatus 300. The data storage apparatus 300 can also include additional components such as an automatic cartridge handling system (not shown) and/or a host device (not shown) such as a computer or the like.

The view provided by FIG. 3 depicts the cartridge 100 initially engaging the receiver 200. That is, if the cartridge 100 is inserted into, or received by, the receiver 200, then the view of FIG. 3 is one that depicts an early stage of such receipt of the cartridge into the receiver. Conversely, if the cartridge 100 had been previously inserted into the receiver 200, and then was to be withdrawn from the receiver, then the view of FIG. 3 is one that depicts a final stage of such withdrawal.

The cartridge 100 and the receiver 200 can be configured in respective manners wherein, when the cartridge 100 is inserted into the receiver 200, at least one of the guide members 220 is matingly received into the female guide region 140. More specifically, when the cartridge 100 includes a pair of female guide regions 140, and the receiver 200 includes a pair of guide members 220, then the cartridge and the receiver can be configured in respective manners wherein, when the cartridge is received into the receiver, each of the guide members is received into an exclusively associated female guide region.

Moreover, when the cartridge 100 includes a pair of female guide regions 140, and the receiver 200 includes a pair of guide members 220, then the cartridge and the receiver can be further configured in respective manners wherein, when the cartridge is received into the receiver, the cartridge is substantially between the pair of guide members.

Additionally, the cartridge 100 and the receiver 200 can be configured in respective manners wherein, when the cartridge is received into the receiver, only minimal clearance exists between a given guide member 220 and the bottom 141 of the associated female guide region 140. In this manner, the cartridge can be substantially "captured" between the pair of guide members, as is depicted in FIG. 3.

The tip region 221 of the guide member 220 can be configured to have a "loose" fit with the front bottleneck region 144 of the associated female guide region 140. In other words, the guide member 220 can be configured such that a given amount of clearance exists between the tip region 221 thereof and the front bottleneck region 144 of the associated female guide region 140.

Such clearance, or "loose fit," between the tip region 221 of the guide member 220 and the front bottleneck region 144 of the female guide region 140 can serve to accommodate slight inaccuracies in the position of the cartridge 100 relative to the receiver 200 when the cartridge initially engages the receiver. Such inaccuracies in position of the cartridge 100 can occur as the result of tolerance build-up in the robotic arm of an automatic cartridge handling system (not shown) or the like.

In other words, the "loose fit" between the tip region 221 and the front bottleneck region 144, as is explained above, can serve to compensate for the fact that most conventional automatic cartridge handling systems (not shown) may not be continually capable of accurately placing the cartridge 100 in a precisely defined, given position, relative to the receiver 200 during insertion of the cartridge into the receiver.

Additionally, the "ramped" nature of the front bottleneck region 144, as is depicted in the figures, can serve to facilitate entrance of the guide member 220 into the associated female guide region 140 when the cartridge 100 is not accurately placed relative to the receiver 200 during insertion of the cartridge 100 into the receiver 200. Moreover, the increased width of the run region 142, relative to the front bottleneck region 144, can serve to accommodate at least slight angular misalignment of the cartridge 100 relative to the receiver 200.

The insertion of the cartridge 100 into the receiver 200 can proceed with movement of the cartridge in a direction that is substantially parallel to the guide members 220. In other words, from the relative positions of the cartridge 100 and the receiver 200 depicted in FIG. 3, the insertion of the cartridge 100 into the receiver 200 can be accomplished by movement of the cartridge 100 such that the cartridge connector portion 130 is moved toward the receiver connector portion 230.

Figure 4:
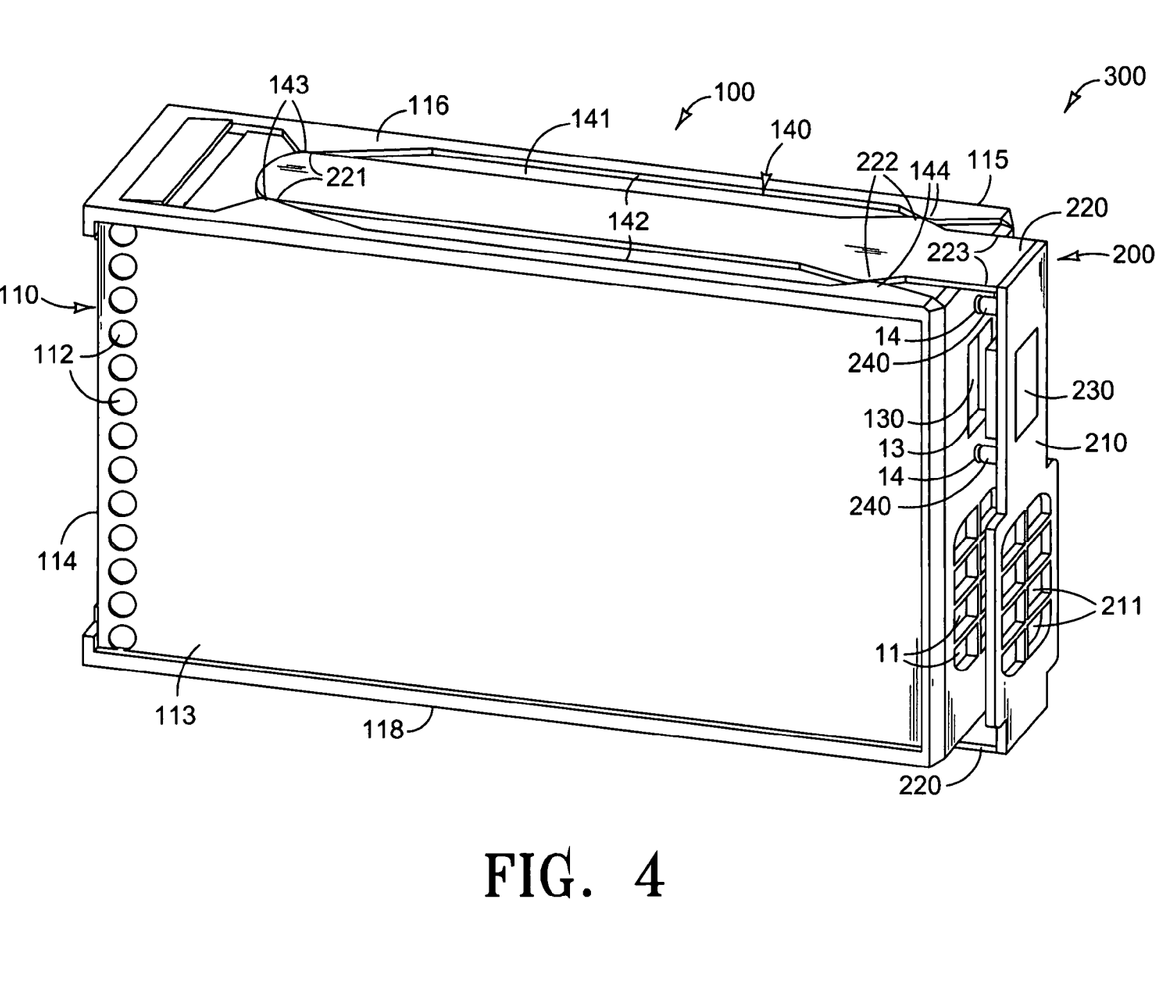
FIG. 4 is an isometric view of the cartridge and receiver of FIG. 3, and wherein the cartridge is nearly fully received into the receiver.

FIG. 4 depicts both the cartridge 100 and the receiver 200. As is mentioned above, one or more of both the cartridge 100 and/or the receiver 200 can make up the data storage apparatus 300. It is noted that the view provided by FIG. 4 depicts the cartridge 100 nearly, but not fully, received into the receiver 200. That is, as is depicted in FIG. 4, the cartridge 100 is almost fully engaged, or inserted, into the receiver 200.

The position of the cartridge 100, relative to the receiver 200, as is depicted in FIG. 4, shows several features. Firstly, it is seen that the tip region 221 of the guide member 220 is engaged with the rear bottleneck region 143 of the female guide region 140. Secondly, the bulge region 222 of the guide member 220 is engaged with the front bottleneck region 144 of the female guide region 140. Thirdly, each of the reference pins 240 is positioned such that further significant movement of the cartridge 100 into the fully inserted position will result in entrance of the reference pins 240 into the respective reference holes 14.

As is seen from a study of FIG. 4, along with a review of FIGS. 1-3, the tip region 221 can be configured to have a "snug" fit with the rear bottleneck region 143. That is, the tip region 221 can be configured such that, when engaged with the rear bottleneck region 143, a close-tolerance fit exists therebetween, wherein minimal clearance exists between the rear bottleneck region and the tip region.

In other words, the term "snug fit", as used herein, is intended to mean a fit between two or more given elements wherein sufficiently minimal clearance exists therebetween to render the fit useful in facilitating alignment between the given elements, and wherein such alignment ultimately facilitates connection of the cartridge connector portion 130 and the receiver connector portion 230.

Furthermore, inasmuch as the tip region 221 can be configured to have a substantially constant width, as described above, it can be appreciated that the snug fit between the tip region 221 and the rear bottleneck region 143 can be "continuous." That is, the configuration of the tip region 221 can be such that the snug fit between the tip region 221 and the rear bottleneck region 143 is maintained in a substantially continuous manner once the tip region 221 engages the rear bottleneck region 143, and as the cartridge 100 is moved toward the fully inserted position relative to the receiver 200.

As is also seen from a study of FIG. 4, along with a review of FIGS. 1-3, the bulge region 222 of the guide member 220 can be configured to have a snug fit with the front bottleneck region 144 of the female guide region 140. However, in contrast to the fit between the tip region 221 and the rear bottleneck region 143, the bulge region 222 and the front bottleneck region 144 can be configured such that the snug fit therebetween is substantially "discontinuous" or "momentary."

That is, the bulge region 222 and the front bottleneck region 144 can be configured in respective manners wherein the fit therebetween is "snug" only for a moment, or at least only for a relatively short duration, as the cartridge 100 is inserted into the receiver 200. Importantly, such a moment, or short duration, during which the fit between the bulge region 222 and the bottleneck region 144 becomes snug, can substantially coincide with the initial entrance of the reference pin 240 into the respective associated reference hole 14.

That is, when the cartridge 100 is moved further toward the fully inserted position in the receiver 200, from the position depicted, then the bulge region 222 will move beyond the front bottleneck region 144, thus ending the snug fit therebetween. As is also noted from further examination of FIG. 4, the end of the snug fit between the bulge region 222 and the front bottleneck region 144 can occur substantially simultaneously with the entrance of each reference pin 240 into the respective associated reference hole 14.

Furthermore, because the reference pins 240 can be relatively small and can be located relatively close to the receiver connector portion 230 (and likewise, because the reference holes 14 can be relatively small and can be located relatively close to the cartridge connector portion 130), the fit between the reference pins 240 and the associated reference holes 14, as well as the positioning of the reference holes and reference pins relative to the cartridge connector portion 130 and the receiver connector portion 230, respectively, can be reasonably maintained at a relatively high degree of precision.

Because the reference pins 240 can be configured to engage the respective associated reference holes 14 prior to the engagement of the cartridge connector portion 130 with the receiver connector portion 230, then the engagement of the reference pins 240 with the respective associated reference holes 14 can serve to substantially precisely align the connector portions 130, 230 immediately prior to the connection thereof.

In view of the aforementioned, it is appreciated that the ending of the snug fit between the bulge region 222 and the front bottleneck region 144, prior to the full engagement of the reference pins 240 with the respective associated reference holes 14, can prevent any binding that could occur as the result of a tolerance mismatch between the fit of the reference pins 240 with the reference holes 14, and the fit of the bulge region 222 with the front bottleneck region 144.

Therefore, the snug fit between the tip region 221 and the rear bottleneck region 143, along with the snug fit between the bulge region 222 and the front bottleneck region 144, can serve to provide alignment of the reference holes 14 with the reference pins 240 in a manner such that the reference pins 240 can successfully enter the reference holes 14.

Subsequently, the ending of the snug fit between the bulge region 222 and the front bottleneck region 144 as the cartridge 100 is moved further toward the fully inserted position in the receiver 200, enables a close-tolerance fit between the reference pins 240 and the respective associated reference holes 14 to "take over." That is, once the reference pins 240 engage the reference holes 14 in a close-tolerance fit therebetween, then the snug fit of the bulge region 222 with the front bottleneck region 144 can possibly conflict with the fit between the reference pins and reference holes due to manufacturing tolerances.

Thus, the ending of the snug fit between the bulge region 222 and the front bottleneck region 144, substantially simultaneously with the engagement of the reference pins 240 with the respective associated reference holes 14, as is described above, can beneficially facilitate alignment of the cartridge connector portion 130 with the receiver connector portion 230 by preventing binding of the reference pins in the reference holes.

Moreover, it is seen that the snug fit between the tip region 221 and the rear bottleneck region 143 can substantially coincide with the snug fit between the bulge region 222 and the front bottleneck region 144. Furthermore, the snug fit between the tip region 221 and the rear bottleneck region 143 can be maintained after the snug fit between the bulge region 222 and the front bottleneck region has ended.

More specifically, the tip region 221 can be configured such that the snug fit between the tip region and the rear bottleneck region 143 is maintained at least from the occurrence of the snug fit between the bulge region 222 and the front bottleneck region 144 until the cartridge 100 is fully inserted, or received, into the receiver 200. In this manner, the substantially continuous snug fit between the tip region 221 and the rear bottleneck region 143, as described above, can facilitate angular alignment of the cartridge 100 relative to the receiver 200, at least during the final stages of insertion of the cartridge into the receiver.

Still referring to FIG. 4, it is seen that the air inlet 11 can be substantially aligned in adjacent, juxtaposed relation to the air outlet 211 when the cartridge 100 is fully inserted into the receiver 200. Likewise, the cartridge connector portion 130 can be substantially aligned with the receiver connector portion 230, in facilitation of connection therebetween, when the cartridge 100 is fully, or nearly fully, received into the receiver 200.

Figure 5:
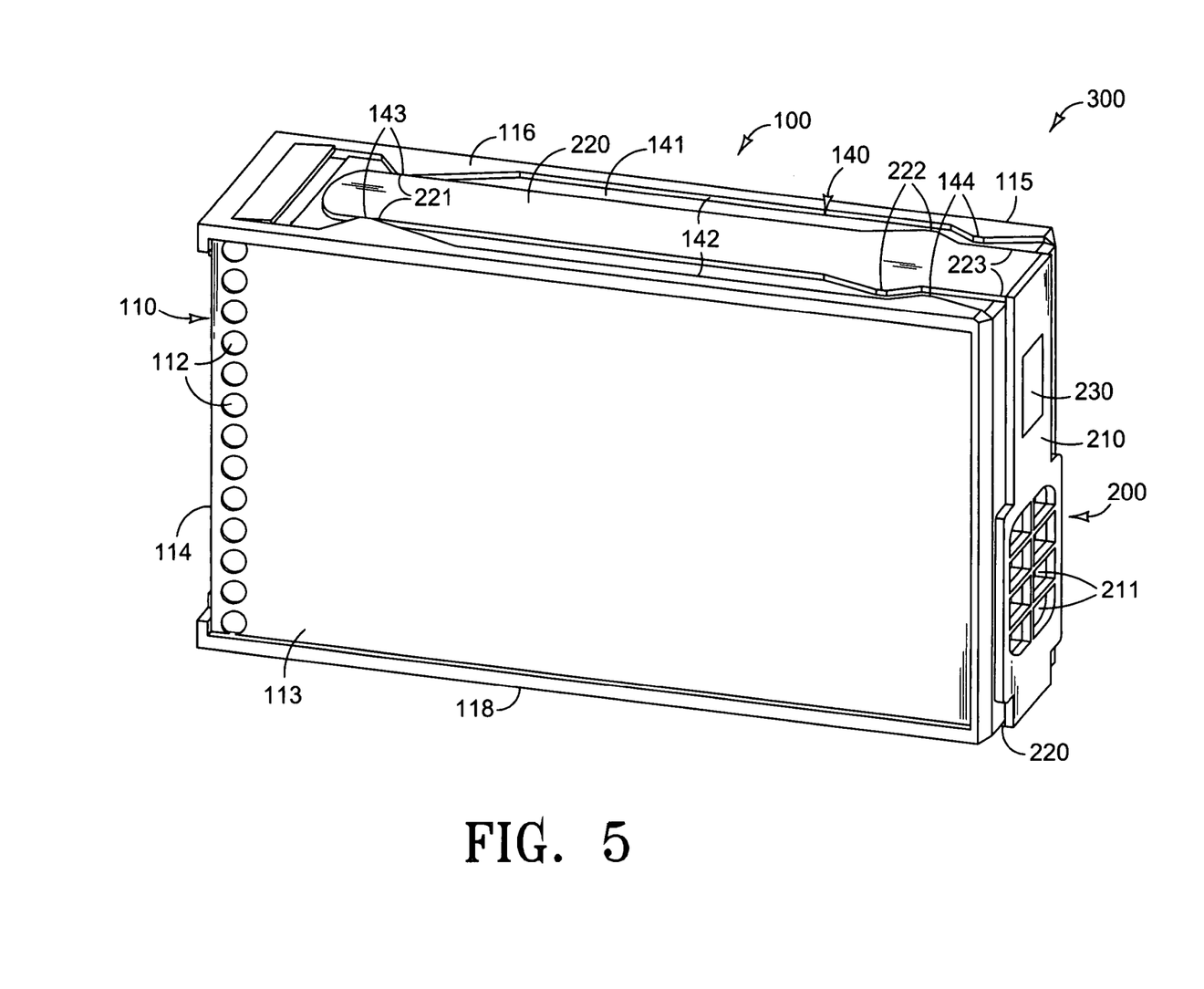
FIG. 5 is an isometric view of the cartridge and receiver of FIGS. 3 and 4, and wherein the cartridge is fully received into the receiver.

FIG. 5 shows both the cartridge 100 and the receiver 200, wherein the cartridge is depicted as being fully received, or inserted, into the receiver. As is seen, when the cartridge 100 is fully inserted, or received, into the receiver 200, the bulge region 222 has moved through and beyond the front bottleneck region 144.

More specifically, with the cartridge 100 fully inserted into the receiver 200, the neck-down region 223 of the guide member 220 can be located within the front bottleneck region 144, wherein a loose fit exists therebetween. Moreover, it is seen that when the cartridge 100 is fully inserted into the receiver 200, the snug fit between the tip region 221 and the rear bottleneck region 144 can be maintained, thus maintaining substantial angular alignment of the cartridge 100 when the cartridge is fully inserted into the receiver 200.

The face 112 of the cartridge 100 can have a substantially adjacent, juxtaposed orientation relative to the chassis 210 when the cartridge is fully inserted into the receiver 200. With such an orientation of the face 112 relative to the chassis 210, the cartridge connector portion 130 (shown in FIGS. 1, 3, and 4) can be in a state of full connection with the receiver connector portion 230. Moreover, such an adjacent orientation of the face 112 relative to the chassis 210 can facilitate a substantial seal therebetween, thus facilitating the flow of the air stream AA (shown in FIGS. 1 and 2) through the air outlet 211 and into the air inlet 11 (shown in FIGS. 1 and 3, and thus into the interior of the cartridge shell 110.

Figure 6:
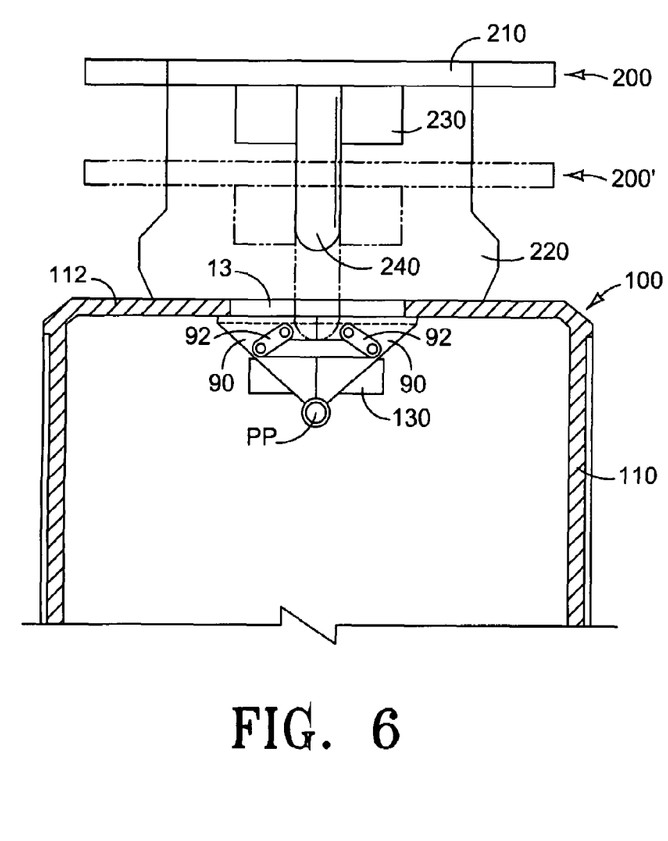
FIG. 6 is a top view of a cartridge in accordance with another embodiment of the present invention.

FIG. 6 shows at least a portion of the cartridge 100 and the receiver 200, in accordance with at least one embodiment of the present invention. That is, it is understood that various portions of both the cartridge 100 and the receiver 200 are omitted from the view provided by FIG. 6 for the sake of clarity.

The cartridge 100 can include at least one door 90, and can include a pair of doors, as is depicted. The door 90 can be configured to cover the connector opening 13 that can be defined in the cartridge shell 110, as is described in greater detail above with reference to FIG. 1. In other words, the door 90 can be configured to protectively cover the cartridge connector 130 (shown in FIG. 1) when the cartridge 100 is not fully received into the receiver 200.

The door 90 can be further configured to uncover the cartridge connector portion 130 by moving to an open position. More specifically, the door 90 can be configured to uncover the cartridge connector portion 130 in response to the reference pin 240 engaging, or entering, the respective reference hole 140 (shown in FIG. 1) as the cartridge 100 is inserted into the receiver 200. In this manner, the door 90 can remain closed except when the cartridge 100 is inserted into the receiver 200.

Thus, the door 90 can serve to protect the cartridge connector portion 130 from inadvertent contact with other objects during handling, storage, and the like, of the cartridge 100. Specifically, the door 90 can protect the cartridge connector portion from becoming damaged, bent, broken, misaligned, or the like, as the result of inadvertent contact and/or impact of the cartridge connector portion 130 with another object during handling, storage, and the like, of the cartridge 100.

Furthermore, the door 90 can prevent the cartridge connector portion 130 from inadvertent contact with an electrically charged, powered, or conductive, element or the like during handling and/or storage. Such contact can result in electrostatic discharge or the like, which can cause permanent loss of data and/or damage to the internal components of the cartridge 100.

In the exemplary configuration depicted in FIG. 6, the doors 90 are configured as a pair of "clamshell" doors that pivot about a pivot point "PP" such as a hinge or the like. A biasing member (not shown) such as a spring or the like, can be included and can be connected to the door 90 to provide a biasing force to bias the door in a closed position. Furthermore, a linkage 92 can be provided and can be operatively connected to each of the doors 90.

With further reference to FIG. 6, it is understood that inasmuch as the view provided therein is a plan view, the respective relative elevations of various components depicted therein is not readily discernable. Accordingly, it is noted that the elevation of the reference pin 240 is not the same as the elevation of the door 90. Furthermore, the elevation of the linkage 92 can be substantially the same as the elevation of the reference pin 240, whereby the reference pin can contact the linkage when entering the cartridge shell 110, as is depicted by the phantom position of the receiver 200'.

Moreover, the pivot point PP can be at an elevation that is substantially between those of the reference pin 240 and the door 90. In this manner, the reference pin 240 can pass the pivot point PP without contacting it, and the pivot point can reside within the cartridge shell 110 without interfering with the positioning of the cartridge connector portion 130 (shown in FIG. 1).

Figure 7:
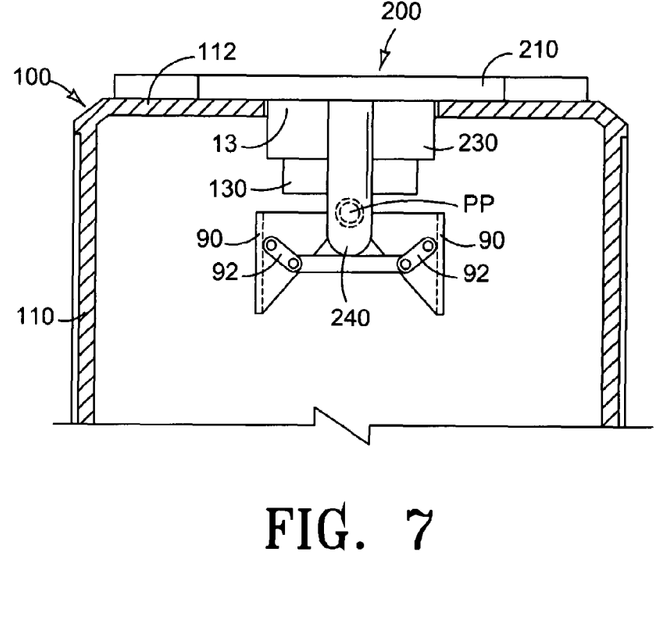
FIG. 7 is another top view of the cartridge of FIG. 6.

FIG. 7 shows the cartridge 100 and the receiver 200 of FIG. 6. As revealed from a study of FIGS. 6 and 7, continued entrance of the reference pin 240 into the interior of the cartridge shell 110 via the reference hole 130 (shown in FIG. 1), can result in engagement of the reference pin with the linkage 92.

Continued engagement of the reference pin 240 with the linkage 92 (for example, when the reference pin presses against the linkage as is depicted in FIGS. 6 and 7) can cause the linkage to pull the doors 90 to an open position against the biasing force of the biasing member, thereby enabling the receiver connector portion (shown in FIG. 2) to pass through the connector opening 13 and to connect with the cartridge connector portion.

Retraction of the reference pin 240 from the respective reference hole (which can occur when the cartridge 100 is removed from the receiver 200) can result in the movement of the door 90 from the open position to the closed position. It is further understood that the configuration of the doors 90 and linkage 92 is exemplary only and is not intended to limit the configuration of the door to any specific form.

Figure 8:
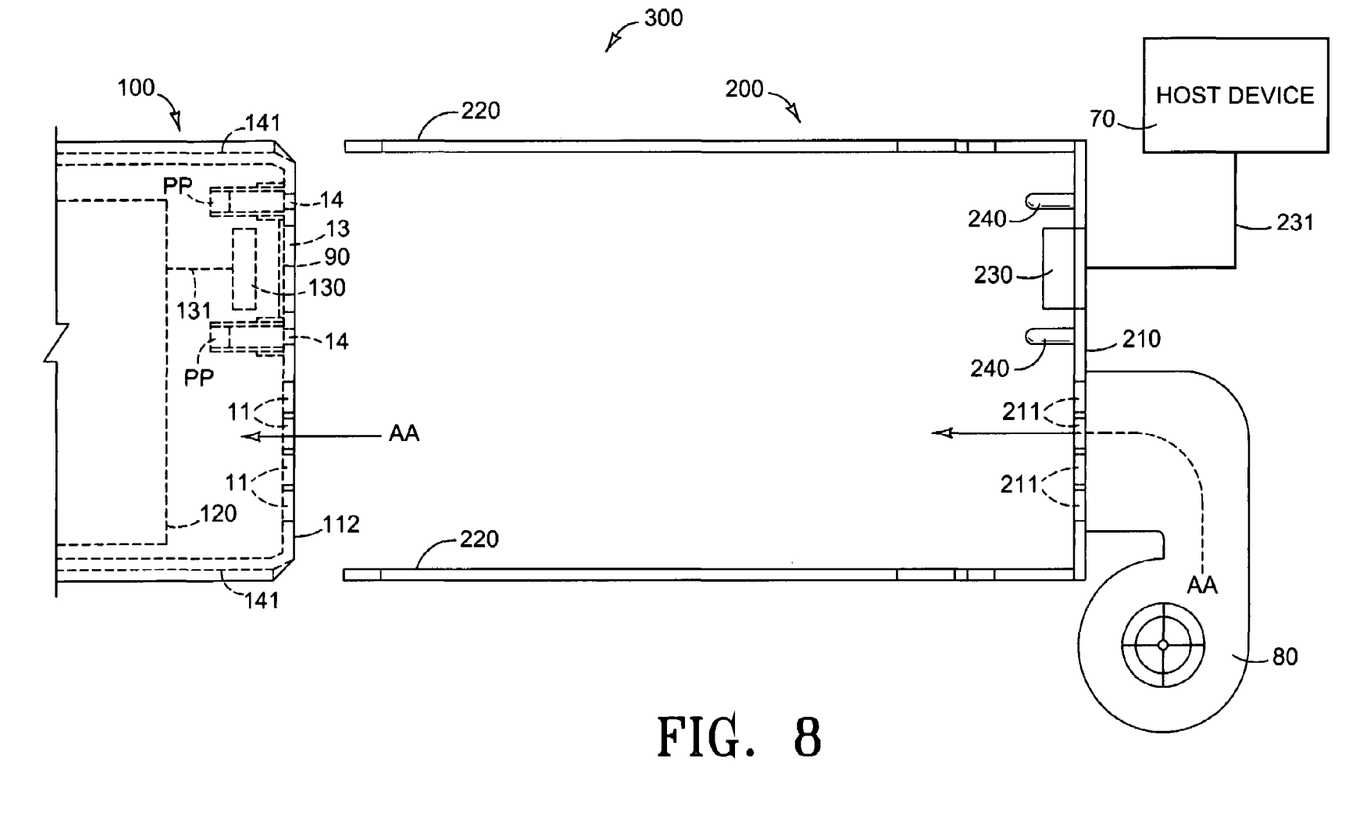
FIG. 8 is a side elevation view of a cartridge and a receiver in accordance with yet another embodiment of the present invention.

FIG. 8 shows a data storage system 300 that can include the cartridge 100 and the receiver 200 in accordance with at least one embodiment of the present invention. A fan 80, or the like, can be provided to induce the flow of the air stream AA through the air outlet 211 and into the air inlet 11. The air stream AA can provide cooling of the interior of the cartridge 100.

With continued reference to FIG. 8, it is understood that the specific relative positions of the cartridge 100 and the receiver 200 are depicted for the sake of clarity and that the flow of the air stream AA into the cartridge by way of the air inlet 11 can be induced with more beneficial results when the cartridge is substantially fully inserted into the receiver.

A cartridge data link 131 can be employed to link the data storage device 120 with the cartridge connector portion 130. Such a data link 131 can have any of a number of known forms, including that of a hard wire, a fiber optic filament, or various wireless means. Similarly, a receiver data link 231 can be employed to link the receiver connector portion 230 with a host device 70, which can be a computer. The receiver data link 231 can also have any of a number of various forms as in the case of the cartridge data link 131.

Figure 9:
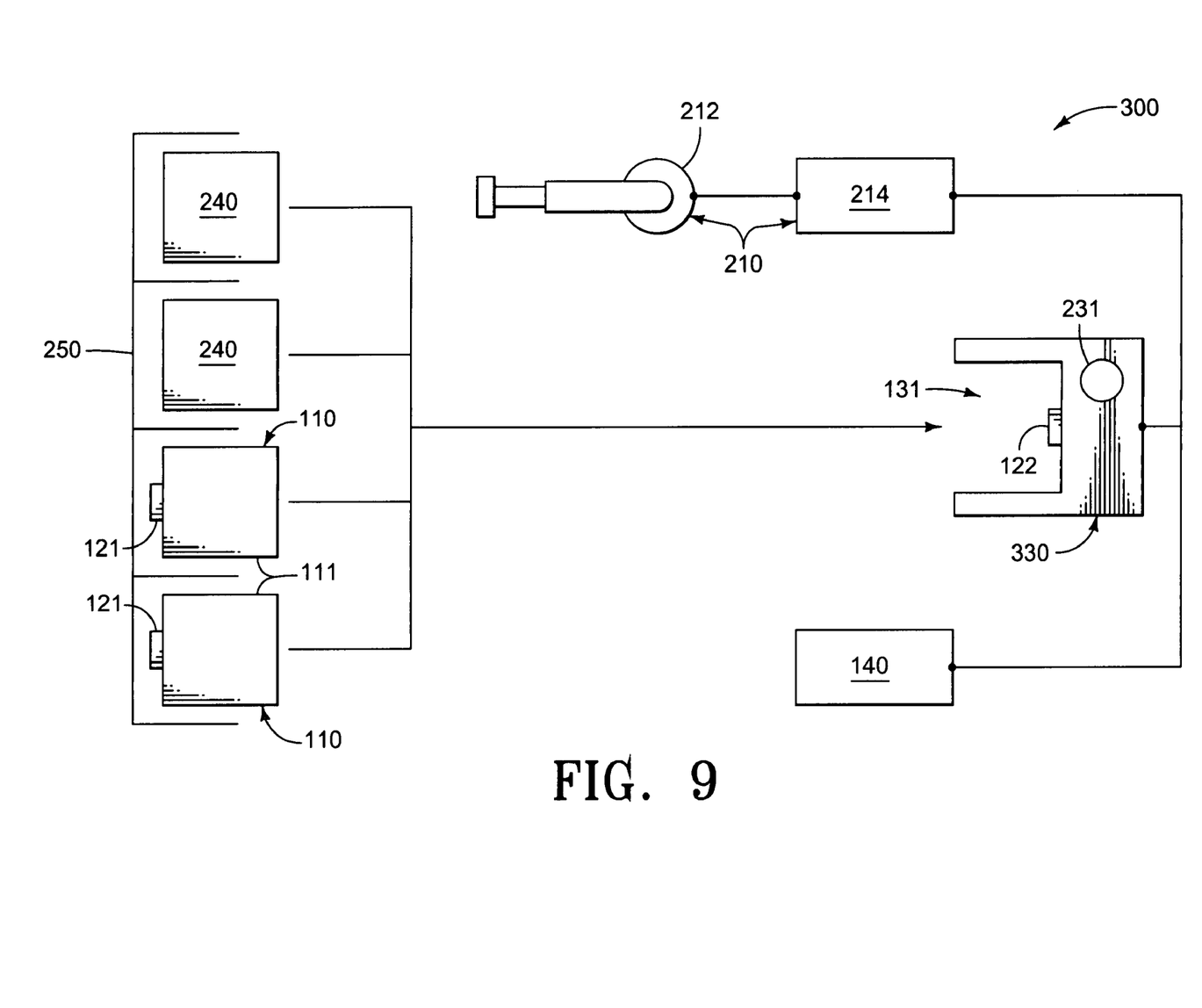
FIG. 9 is a view of a data storage system in accordance with yet another embodiment of the present invention.

FIG. 9 shows a data storage apparatus 300, or system, in accordance with yet another embodiment of the present invention. The data storage system 300 can include at least one cartridge 100 and at least one receiver 200. The cartridge 100 and the receiver 200 are described in detail above with respect to FIGS. 1 through 8. A host device 70 can also be included in the data storage system 300. The host device 70 is discussed above with reference to FIG. 7.

The data storage system 300 can further include a cartridge support 304 that is configured to support at least one cartridge 100 in a storage mode. That is, the cartridge support is configured such that at least one cartridge 100 can be stored on the cartridge support remotely from the receiver 200. The cartridge support 304 can be in the form of a storage rack, or the like.

The data storage system 300 can include a picking device 302. The picking device 302 is configured to selectively move a cartridge 100 from the cartridge support 304 to the receiver 200. More specifically, the picking device 302 can be configured to operate so as to grasp a cartridge 100 while the cartridge is supported on the cartridge support 304. The robotic arm can then withdraw the cartridge 100 from its supported position on the cartridge support 304, and move the cartridge to the receiver 200, and insert the cartridge into the receiver in the manner described above with respect to FIGS. 1 through 7.

A controller 306 can also be included in the data storage system 300. The controller 306 is configured to control operation of the picking device 302. As is described above with reference to FIG. 8, the receiver data link 231 can be employed to communicatively link the receiver 200 with the host device 70. Additionally, the receiver data link 231 can be employed to communicatively link the picking device 302 with the controller 306. The receiver data link 231 can also communicatively link the controller 306 with the host device 70.

During operation of the data storage system 300, the host device 70 can determine that access to given data contained in a given cartridge 100 is required. The host device 70 can then send a request to the controller 306 to move the given cartridge from the cartridge support 304 to the receiver 200.

The controller 306 can then determine the location of the given cartridge 100 on the cartridge support 304. Once the location of the given cartridge is determined, the controller 306 can then cause the picking device 302 to retrieve the given cartridge 100 from the cartridge support 304 and to then insert the cartridge into the receiver 200. Upon insertion of the given cartridge 100 into the receiver, the given data contained on the cartridge can be accessed by the host device 70.

When the given data on the given cartridge 100 has been accessed by the host device 70, the host device can then send a request to the controller 306 to remove the given cartridge from the receiver 200, and to replace the given cartridge into the cartridge support 304. The controller 306 can then instruct the picking device 302 to carry out the request.

A method of receiving a cartridge into a receiver in accordance with yet another embodiment of the present invention includes momentarily aligning a front side of the cartridge with the receiver while substantially continuously maintaining alignment of a rear side of the cartridge with the receiver. Such a method can be accomplished by providing a cartridge, such as the cartridge 100 described above, and by providing a receiver, such as the receiver 200 described above.

More specifically, the method can include engaging a front receiver guide feature with a rear cartridge guide feature. The method can also include engaging a rear receiver guide feature with a front cartridge guide feature. The front receiver guide feature can be substantially continuously snugly engaged with the rear cartridge guide feature while the rear receiver guide feature can be substantially momentarily snugly engaged with the front cartridge guide feature.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A data storage cartridge comprising:
   a memory device;
   a cartridge connector portion linked with the memory device for signal transmission therebetween; and,
   a cartridge shell that:
      houses the memory device;
      supports the cartridge connector portion; and,
      supports an elongated cartridge guide region that comprises:
         a front cartridge guide feature that is substantially proximate the cartridge connector portion;
         a rear cartridge guide feature that is distal from the cartridge connector portion; and
         a run region that extends between the front and rear cartridge guide features and is wider than both the front and rear cartridge guide features.

2. The data storage cartridge of claim 1, wherein the front and rear cartridge guide features are bottlenecks with a narrowed region.

3. The data storage cartridge of claim 1, and wherein the run region has a substantially constant width, and the front and rear cartridge guide features are located at opposite ends of the run region.

4. The data storage cartridge of claim 3, and wherein the run region is an open slot that is defined by a substantially flat bottom and a pair of substantially parallel, spaced-apart, juxtaposed walls extending substantially perpendicularly from the bottom.

5. The data storage cartridge of claim 1, and wherein:
   the cartridge guide region is substantially a female guide region defined by the cartridge shell;
   the front cartridge guide feature is substantially a front bottleneck region defined by the female guide region; and,
   the rear cartridge guide feature is substantially a rear bottleneck region defined by the female guide region.

6. The data storage cartridge of claim 5, and wherein the front bottleneck region is wider than the rear bottleneck region.

7. The data storage cartridge of claim 1, and wherein:
   the cartridge shell supports a pair of elongated cartridge guide regions in substantially parallel, offset, juxtaposed relation to one another; and,
   each cartridge guide region comprises:
      a front cartridge guide feature that is substantially proximate the cartridge connector portion; and,
      a rear cartridge guide feature that is distal from the cartridge connector portion.

8. The data storage cartridge of claim 7, and further wherein:
   each cartridge guide region is substantially a female guide region;
   each front cartridge guide feature is substantially a front bottleneck region; and,
   each rear cartridge guide feature is substantially a rear bottleneck region.

9. The data storage cartridge of claim 1, and wherein:
   the cartridge is configured to be supportably received into a receiver that includes a chassis, a guide member extending from the chassis, and a receiver connector portion supported by the chassis;
   the receiver connector portion is configured to matingly connect with the cartridge connector portion for signal transmission therebetween when the cartridge is received into the receiver; and,
   the guide member is configured to matingly engage the cartridge guide region as the cartridge is received into the receiver.

10. The data storage cartridge of claim 9, and wherein:
    the guide member defines a front receiver guide feature and a rear receiver guide feature;
    the front receiver guide feature is configured to engage the rear cartridge guide feature as the cartridge is received into the receiver; and,
    the rear receiver guide feature is configured to engage the front cartridge guide feature as the cartridge is received into the receiver.

11. The data storage cartridge of claim 10, and wherein:
    the front receiver guide feature is configured to engage the rear cartridge guide feature with a substantially continuous snug fit as the cartridge is received into the receiver; and,
    the rear receiver guide feature is configured to engage the front cartridge guide feature with a substantially momentary snug fit as the cartridge is received into the receiver.

12. The data storage cartridge of claim 11, and wherein the rear receiver guide feature and the front cartridge guide feature are configured such that the momentary snug fit ends prior to engagement of the cartridge connector portion and the receiver connector portion.

13. The data storage cartridge of claim 12, and wherein:
the cartridge further comprises a cartridge reference guide feature; and,
the receiver further includes a receiver reference guide feature that is configured to matingly engage the cartridge reference feature after the end of the snug fit between the front cartridge guide feature and the rear receiver guide feature and before the engagement of the cartridge connector portion and the receiver connector portion.

14. The data storage cartridge of claim 13, the cartridge further comprising a door supported by the cartridge shell and configured to:
protectively cover the cartridge connector portion when the cartridge is not received into the receiver; and,
uncover the cartridge connector portion in response to engagement of the receiver reference guide feature with the cartridge reference guide feature.

* * * * *